Patented Apr. 5, 1932

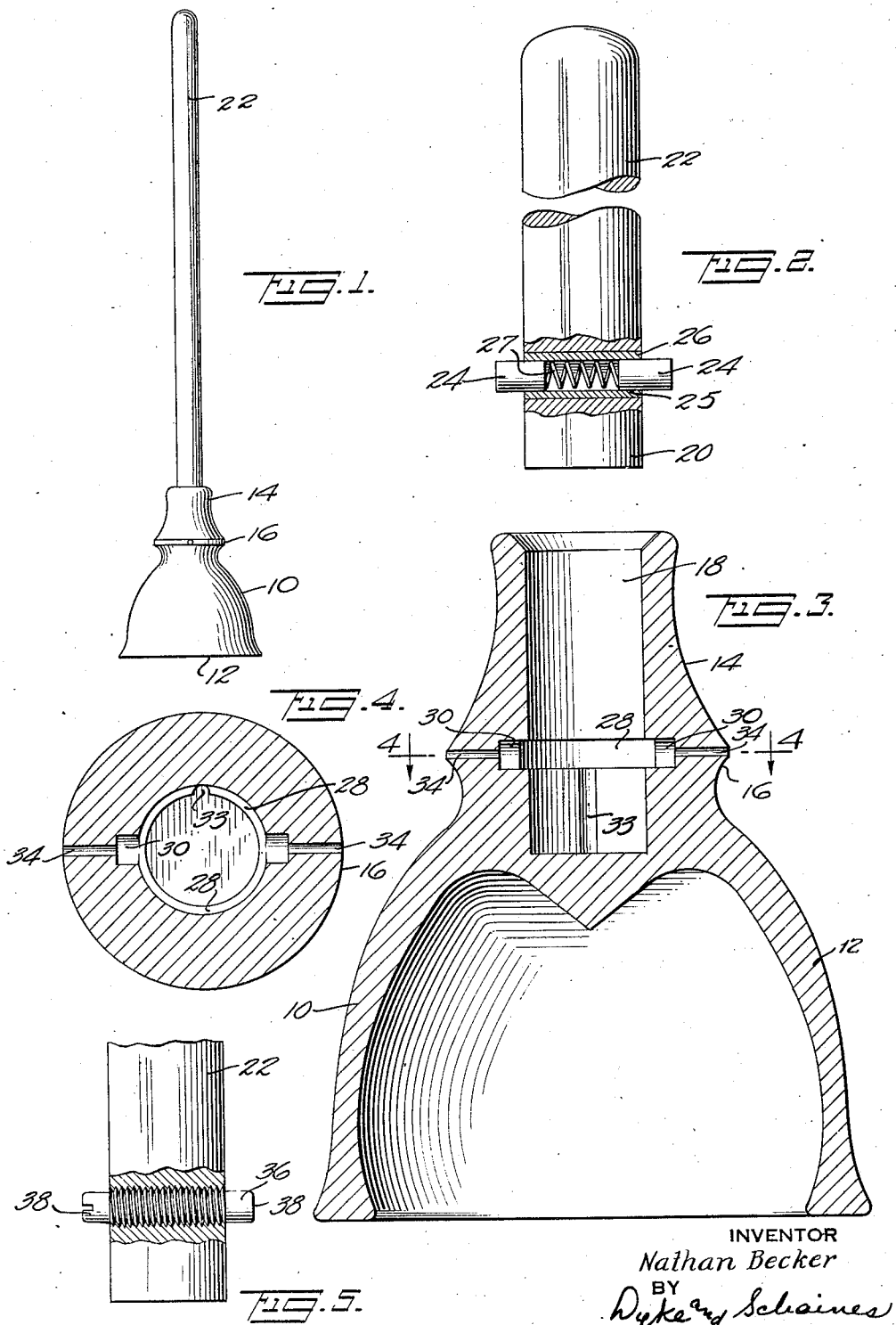

1,852,071

UNITED STATES PATENT OFFICE

NATHAN BECKER, OF NEW YORK, N. Y.

FASTENING MEANS FOR FORCE CUPS

Application filed June 24, 1930. Serial No. 463,384.

My invention relates to means for fastening together parts, such as the handle and yieldable force cup of suction devices used by plungers, and the same has for its object to provide a simple, reliable and efficient device in which the parts upon the assembly thereof are secured against relative movement or separation.

Another object of the invention is to provide a device of the character specified in which the locking means is disposed entirely within the confines of the parts and interengages therewith to retain the parts against separation and relative rotation.

Another object of the invention is to provide a device of the character specified in which the gripping action of the yieldable part, or socket of the force cup, on the other part, or handle, in securing the parts together is supplemented by locking means readily received into the interior or socket of the yieldable part to coact therewith in locking the parts against relative movement.

Another object of the invention is to provide a device of the character specified in which the socket is rendered more effective in its gripping action on the handle by venting the air from the socket.

Another object of the invention is to provide a device of the character specified in which the means for mechanically locking the parts together in part serves to effect the venting of air from the socket to render the same more effective in its gripping action.

In the accompanying drawings:

Figure 1 is an elevation of one form of device constructed according to and embodying my said invention;

Fig. 2 is an enlarged view of the lower end of the handle of said device with part thereof in section;

Fig. 3 is an enlarged vertical section through the yieldable portion of the device;

Fig. 4 is a section thereof on the line 4—4 of Fig. 3; and

Fig. 5 is a detail of a modified form of locking means.

Referring to the drawings, I have illustrated a part 10 composed of rubber or like yieldable material and including a force cup portion 12, and socket or neck portion 14 having a thickened wall portion 16, the opening or socket 18 therein being adapted to receive the end 20 of the handle 22. Two pins 24—24 are mounted within a passage 25, reinforced by sleeve 26, if desired, the pins extending diametrically through the handle 22. The pins 24 are normally held projected by the spring 27, disposed in said passage intermediate the pins.

An annular or circumferential groove 28 is formed in the thickened portion of the yieldable wall 14 within the socket 18 at a lower or intermediate portion thereof. Diametrically opposed notches or recesses 30—30 are likewise formed in the wall portion 16 and extend outwardly from said groove 28 which forms means for guiding the pins 24 into said notches 30.

In assembling the parts, the pins 24—24 are first forced inward against the tension of the spring 27. The end 20 of the handle is then forced into the opening 18 which is preferably of a slightly smaller diameter than the handle so that adequate gripping action of the yieldable wall 14 on the handle is obtained. When the pins 24—24 register with groove 28, they are forced outwardly by the spring 27, and enter said groove 28. The handle is then rotated until said pins 24—24 are received into the notches or recesses, 30—30 whereby to lock the parts together both against separation and rotation relative to each other.

To assure a tight fit, the socket 18 may be provided with air vent holes 34—34 therethrough communicating with notches 30 and groove 28 so that the air readily escapes from socket 18 when the handle 22 is forced thereinto. An air vent groove 33 terminating in groove 28 may also be provided, if so desired, for the escape of air from the lower portion of the socket 18.

In removing the handle, a suitable tool, or a wire is inserted through the vent holes 34—34 to push the pins 24—24 from the notches 30—30 and groove 28, and thereupon the handle may be readily withdrawn.

A modified form of construction is shown at Fig. 5, in which a member 36 extends diametrically through the lower end of the handle and is fixed or threaded thereto, the projecting ends 38—38 being adapted to be received within the notches 30.

Since the wall 14 of the force cup 10 is yieldable, the ends 38—38, and of course the yieldable pins 24 also are readily forced through the opening or socket 18 into locking position.

By my invention, a tight gripping of the handle by the yieldable socket is obtained because of the provision for the escape of air as the handle is inserted. Such gripping action is supplemented by the interiorly located mechanical fastening means which can be readily inserted into the socket because of the yieldability thereof, the parts being effectively held thereby against separation and relative rotation, during use of the suction device, and such air venting means being adapted for allowing the pins 24 to be retracted to permit removal of the handle.

Having thus described my invention, what I claim and desire to secure by Letters Patent is:

1. In combination, a member having a yieldable socket portion provided with air venting recesses on the interior thereof, a member adapted to be received into said socket to be gripped thereby, and means on said second member adapted to engage in said recesses to lock the parts together.

2. In combination, a member including a yieldable socket portion having a circumferentially extending groove upon the interior thereof intermediate the ends thereof, and a vertical groove upon the interior thereof extending from the lower end of the socket and terminating in said first named groove, said first named groove having an air vent therefrom through the wall of the socket, a member adapted to be received into said socket, and means thereon engaging the circumferential groove to lock the members together.

3. In combination, a member having a yieldable socket portion, a member to be received therein, and means on said members adapted to be enclosed by said socket portion for locking the parts together against separation and rotation, said locking means including recesses in said socket portion provided with air venting means.

4. In combination, a force cup having a yieldable socket portion provided with recesses therein having air venting openings, and a handle provided with projecting means adapted to be received into said recesses, said recesses providing channels for the escape of air through said openings as the handle is inserted in the socket.

5. In combination, a member having a yieldable socket provided with a circumferential groove therein and recesses extending from said groove, and a member adapted to be received into said socket and having projecting portions adapted to engage said grove to be guided thereby into said recesses.

6. In combination, a force cup including a socket portion having a groove therein and locking recesses extending from said groove, and a handle having projecting portions adapted to be received into the locking recesses.

7. In combination, a force cup including a socket portion having a circumferential groove therein and recesses extending from said groove, and a handle having spring pressed pins adapted to project beyond the same and enter said groove to be guided thereby into said recesses, whereby to lock the parts together against separation and relative rotation.

8. In combination, a force cup including a yieldable socket portion having an annular groove therein at an intermediate point and recesses extending from said groove, a handle adapted to be received into said socket portion to be gripped by the walls thereof, and spring projected pins adjacent to the end of said handle adapted to engage in said groove to be guided into said recesses, whereby to supplement the gripping action and lock the parts together against separation and relative rotation.

9. In combination, a member having a socket, and a member to be received into said socket, said socket having an annular groove therein intermediate the ends thereof and diametrically opposed recesses extending outwardly from said groove, and spring projected members on said second member movable diametrically thereof and adapted to be received into said groove to be guided thereby into said recesses, whereby to lock the members together against separation and relative rotation.

10. In combination, a force cup including a yieldable socket portion having an annular groove therein and oppositely disposed recesses extending from said grooves, air vents communicating with certain of said recesses and said groove, a handle to be received into said socket to be gripped thereby, the air being forced out through said vents, and pins adjacent to the end of said handle adapted to engage in said groove to be guided thereby into said recesses, whereby to lock the parts together against separation and relative rotation.

11. In combination, a member including a yieldable socket portion having recesses therein, and a member having fixed portions projecting therefrom adjacent one end, and adapted to be received into said socket portion to be gripped thereby, and said projecting portions being received into said recesses.

12. In combination, a member having a yieldable socket portion, and a member to be received into said socket portion, said socket portion having an annular groove therein intermediate the ends thereof and oppositely disposed recesses extending outwardly relative to the grooves, and projecting portions on said second member adapted to be received into said groove to be guided thereby into said recesses, whereby to lock the members together against separation and relative rotation.

In testimony whereof, I have signed my name hereto.

NATHAN BECKER.